Figure 1:
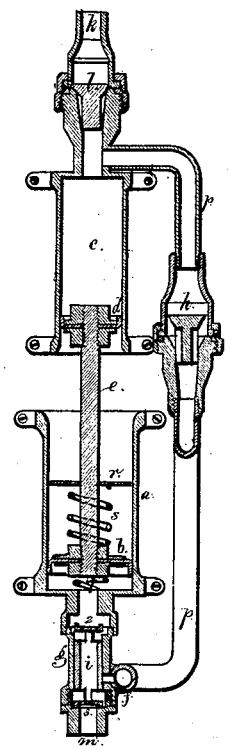

H. H. Craigie,
Water Elevator.

No. 104,934.          Patented July 5, 1870.

Witnesses,
Chas. H. Smith
Geo. A. Walker

Hugh H. Craigie
per L. W. Serrell atty.

United States Patent Office.

HUGH H. CRAIGIE, OF NEW YORK, N. Y.

Letters Patent No. 104,934, dated July 5, 1870; antedated June 29, 1870.

IMPROVEMENT IN AUTOMATIC WATER-ELEVATING APPARATUS.

The Schedule referred to in these Letters Patent and making part of the same.

*To all whom it may concern:*

Be it known that I, HUGH H. CRAIGIE, of the city and State of New York, have invented and made a new and useful Improvement in Means for Raising Water; and I do hereby declare the following to be a correct description of the same.

In many cities the supply of water is abundant, but the pressure is not sufficient to raise the water to the upper stories of buildings; hence a tank or reservoir is usually provided in the upper part of the building, and a pump employed for forcing water up into the said reservoir. This operation requires considerable or frequent manual labor.

The amount of water used in the kitchen and lower stories of the building is usually much greater than that in the upper floors.

My invention relates to a simple means for raising a smaller quantity of water to a greater height than the head, by availing of the pressure of the water itself, exerted in connection with the larger quantity of water that is used in the kitchen or lower stories of the building, below the level of the head of water.

This invention is to be distinguished from water-engines, that are self-operating when the water is running, because, in those engines, the water may be allowed to run constantly to waste, while a portion is thereby being pumped up, my device being dependent entirely upon the alternate opening and closing of the cocks below the level of the head when the water is drawn or shut off by hand.

My invention consists of two vessels of different capacity, with pistons united together, and combined with a supply-pipe to each vessel, and cocks or valves arranged so that the water for use below the level of the head is drawn from the larger vessel, which forms a reservoir, containing sufficient water to supply what may be required to be drawn at one time; at the same time water from the head runs into the smaller vessel, and then, when the drawing of the water is stopped, the pressure of the head of water becomes self-acting in the larger cylinder or reservoir, and operates a pump to force the contents of the smaller vessel to a greater height than the head. In my apparatus there is very little friction, and, the vessels being proportioned in size to the relative heads of water, the less pressure is effective in forcing the smaller quantity of water a greater height, and the apparatus becomes constantly operative every time water is drawn, whether in greater or lesser quantities, but, whenever the larger vessel is emptied, no more water can be drawn until the cocks have been closed, and the larger vessel allowed to fill, or partially so. The larger vessel should, however, be of sufficient capacity to contain as much water as is likely to be drawn at one time in the lower part of the building.

In the drawing—

I have shown a vertical section of my said apparatus in figure 1; and in

Figure 2:
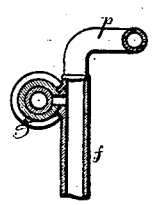

Figure 2, a sectional view of the induction tube and cut-off.

The larger cylinder or vessel, $a$, contains a piston, $b$. I prefer the cup-leather shown, as causing but little friction.

$c$ is the smaller vessel or cylinder, with the piston, $d$. These pistons, $b$ and $d$, are connected directly to each other by the rod $e$, as shown, or they might be fitted with a lever, between separate piston-rods, so that the smaller vessel, $c$, may be used as a pump, worked by hand, when the apparatus itself may not be sufficient, on any special occasions, to supply all the water required at the higher level.

The water-pipe $p$, from the supply-head is connected to the ferrule $f$ of the induction-tube $g$; it also passes on to the vessel $c$, being provided with a check-valve at $h$; and $k$ is the rising pipe to the reservoir, and $l$ is a check-valve to the same.

From the bottom of the induction-tube $g$ a pipe, $m$, leads to the cocks of the kitchen, or to any places where the water is to be used at a lower level than that of the supply-head.

Within the induction-tube $g$ is a cut-off, $i$, made as a sliding cylinder, with heads, 2 and 3, supported by arms from the cylinder $i$, so that the flow of water through said cut-off will not be checked, but, when the cylinder is at its limit of motion in one direction, the opening into the tube $g$ from the ferrule $f$ is closed by being covered with the cylinder $i$; and this is the position that the cut-off assumes when one of the cocks from the pipe $m$ is opened; hence the water will run out of the vessel $a$, and the inlet of water from $f$ to said vessel $a$ will be closed.

As soon as the cock of $m$ is closed the pressure in $a$ accumulates from a slight leakage allowed around the cut-off $i$, and the cut-off $i$ is thereby moved so as to uncover the opening from $f$, the water, as it passes into the cylinder $a$, giving motion to this light cut-off by acting against the head 2.

The water in $a$, acting against a larger area of piston, is enabled to move the piston $d$, and the higher column of water above the cylinder $c$, in consequence of the cylinders $a$ and $c$, being properly proportioned, reference being had to the relative heights of the heads of water.

The valve $h$ may be lifted automatically by a connection to a float in the reservoir, so that the apparatus will thereby be thrown out of action when the reservoir is filled, the water from $c$ being forced back against the lower head in $p$, instead of going off by the pipe $k$ to the reservoir.

By these means the act of drawing water from the cylinder or reservoir *a* causes a proportionate amount of water to pass into the cylinder *c*, and, when the cock to *a* is closed, the pressure of the water, in refilling the reservoir *a*, forces out water from *c* to the higher level, and the vessel *c* becomes a pump.

I avoid concussion in these operations by placing a disk, *r*, around the piston-rod *e*, and a spring, *s*, below it, so that, when the said disk takes against the lower end of *c*, the spring *s* will gradually arrest the further movement.

A spring, *t*, below the piston *b*, prevents concussion as the vessel *a* is emptied, and also acts as a stop, so that the edges of the cup-leather will not be injured.

The cylinders *a* and *c* may be sustained in any desired manner. I prefer to have them connected by an open-work guard and an overflow, provided near the upper edge of the cylinder or reservoir *a*, and leading to a sewer, may be used to take off any leakage.

In cases where the vessels *a c* are placed side by side, and the piston-rods connected by a lever, the position of the fulcrum of that lever may be variable, or placed at whatever point may be necessary for enabling the pressure of water in the reservoir or vessel *a* to throw up water from the cylinder or pump *c* to the desired heights.

I claim as my invention—

1. The vessels *a* and *c*, and pistons *b* and *d*, connected and acting together, substantially as specified, in combination with the pipe *m*, for drawing water at will from the vessel *a*, substantially as and for the purposes set forth.

2. A self-acting cut-off between the supply and the vessel *a*, to operate, when water is drawn at will out of said vessel *a*, substantially as and for the purposes set forth.

3. The sliding cylinder *i* and heads 2 and 3, combined with the inlet water-way *g*, vessel *a*, and pipes *m* and *p*, as and for the purposes specified.

4. The sliding cylinder *i*, forming a cut-off between the inlet-pipe *p f* and the vessel *a*, in combination with the pipes *m* and *k*, and vessels *a c* and pistons *b d*, substantially as and for the purposes specified.

Dated this 10th day of November, A. D. 1869.

H. H. CRAIGIE.

Witnesses:
  CHAS. H. SMITH,
  GEO. T. PINCKNEY.